United States Patent
Kullin

(12) 
(10) Patent No.: US 9,261,137 B2
(45) Date of Patent: Feb. 16, 2016

(54) BEARING ASSEMBLY WITH RING RETAINER

(71) Applicant: Arne Lars Jonas Kullin, Ann Arbor, MI (US)

(72) Inventor: Arne Lars Jonas Kullin, Ann Arbor, MI (US)

(73) Assignee: AKTIEBOLAGET SKF, Gothenburg (SE)

( * ) Notice: Subject to any disclaimer, the term of this patent is extended or adjusted under 35 U.S.C. 154(b) by 24 days.

(21) Appl. No.: 13/717,878

(22) Filed: Dec. 18, 2012

(65) Prior Publication Data

US 2014/0169716 A1 Jun. 19, 2014

(51) Int. Cl.
| | |
|---|---|
| F16C 33/66 | (2006.01) |
| F16C 33/04 | (2006.01) |
| F16C 33/58 | (2006.01) |
| F16C 19/24 | (2006.01) |
| F16C 23/10 | (2006.01) |
| F16C 25/08 | (2006.01) |
| F16C 19/16 | (2006.01) |

(52) U.S. Cl.
CPC .............. *F16C 25/083* (2013.01); *F16C 19/163* (2013.01)

(58) Field of Classification Search
CPC .............................. F16C 25/083; F16C 19/163
USPC ......... 384/493, 513, 515, 517, 537, 539, 557, 384/561, 563, 564, 581
See application file for complete search history.

(56) References Cited

U.S. PATENT DOCUMENTS

| | | | | |
|---|---|---|---|---|
| 2,877,068 | A * | 3/1959 | Schaefer | 384/537 |
| 2,989,327 | A * | 6/1961 | Heinrich | 403/372 |
| 4,573,809 | A * | 3/1986 | Jacob | 384/493 |
| 6,502,995 | B1 * | 1/2003 | Ozsoylu | 384/496 |
| 6,540,406 | B1 * | 4/2003 | Matsuoka | 384/517 |
| 6,688,774 | B2 * | 2/2004 | Kullin et al. | 384/539 |
| 7,377,695 | B2 * | 5/2008 | Qiu et al. | 384/504 |
| 8,746,982 | B2 * | 6/2014 | Ito et al. | 384/463 |
| 2012/0144939 | A1 * | 6/2012 | Kullin et al. | 74/25 |

FOREIGN PATENT DOCUMENTS

GB          2010986 A   *   7/1979

* cited by examiner

*Primary Examiner* — Adam D Rogers
(74) *Attorney, Agent, or Firm* — Mark Ussai; SKF USA Inc. Patent Dept.

(57) ABSTRACT

A bearing assembly is for rotatably coupling a shaft and a housing includes an inner ring with an inner surface disposable about the shaft, an outer ring disposed about the inner ring and having an outer circumferential surface, and a plurality of rolling elements disposed between the inner and outer rings. A retainer has a first end engageable with the shaft or housing and a second end engaged with the inner ring or outer ring. The retainer positions the inner or outer ring with respect to the central axis such that the ring is generally centered on the axis. The retainer is further configured to substantially prevent angular displacement of the inner or outer ring about the central axis and to bias the ring generally axially.

20 Claims, 7 Drawing Sheets

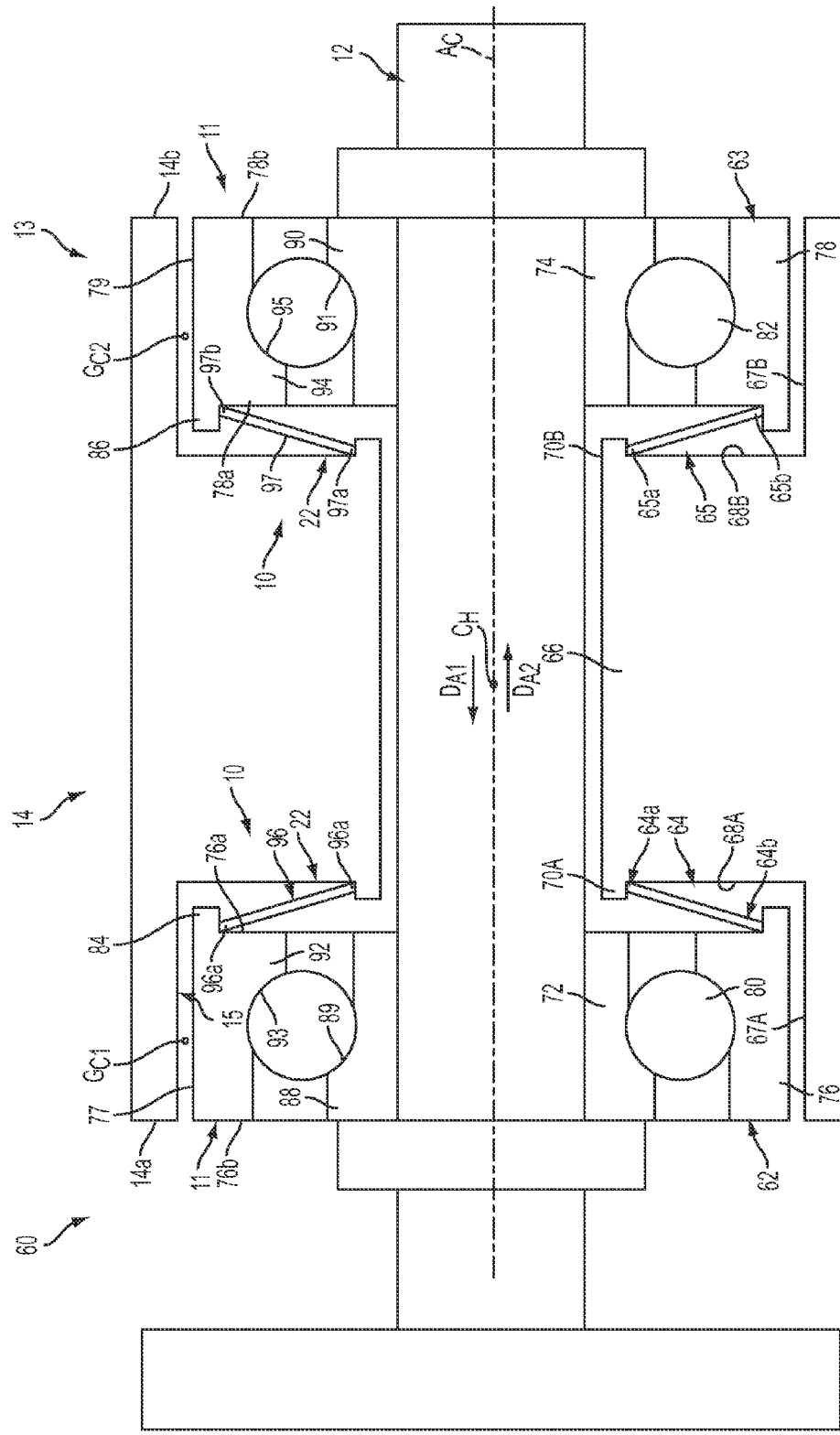

BEARING ASSEMBLY WITH RING RETAINER

BACKGROUND OF THE INVENTION

The present invention relates to bearings, and more particularly to rolling element bearings with a device for establishing preload.

Certain bearing assemblies, such as "double bearing" assemblies for supporting X-ray tube actuators, include two axially spaced apart bearings rotatably coupling a shaft with a housing. Often, these bearing assemblies include a spring or other means to axially bias the bearing outer ring generally toward the inner ring in order to establish a preload. In order to enable the axial displacement of the outer ring, the fit between the outer surface of the outer ring and the inner surface of the housing must permit at least a limited amount of sliding movement of the bearing outer ring.

However, at elevated operating temperatures, the housing and/or the bearing expands, which may eliminate the sliding fit of the outer ring within the housing. As such, the outer ring may become "stuck" and create excessive clearance within the bearing itself (i.e., insufficient preload or no preload) or generate an inward radial force on the bearing that could cause skidding or sliding of the rolling elements within the bearing raceways.

SUMMARY OF THE INVENTION

In one aspect, the present invention is a bearing assembly for rotatably coupling a shaft and a housing, the shaft being rotatable about a central axis and the housing having an inner circumferential surface defining a bore. The bearing assembly comprises an inner ring disposable upon the shaft and an outer ring disposed about the inner ring and having an outer circumferential surface. A plurality of rolling elements is disposed between the inner and outer rings. Further, a retainer has a first axial end engageable with the shaft or the housing and a second axial end engaged with the inner ring or the outer ring. The retainer is configured to position the engaged one of the inner ring or outer ring with respect to the central axis such that the ring is generally centered on the axis.

In another aspect, the present invention is a rotary assembly comprising a housing having an inner circumferential surface defining a bore, a shaft disposed within the housing bore and rotatable about a central axis, and a bearing. The bearing includes an inner ring disposed upon the shaft, an outer ring disposed about the inner ring and having an outer circumferential surface, and a plurality of rolling elements disposed between the inner and outer rings. Further, a retainer has a first axial end engaged with the shaft or the housing and a second axial end engaged with the inner ring or the outer ring. The retainer is configured to position the engaged inner ring or outer ring with respect to the central axis such that the ring is generally centered on the axis.

In a further aspect, the present invention is a rotary assembly comprising a housing having an inner circumferential surface defining a bore, a shaft disposed within the housing bore and rotatable about a central axis, and first and second bearings spaced apart axially along the shaft. Each one of the first and second bearings includes an inner ring disposed upon the shaft, an outer ring disposed about the inner ring and having an outer circumferential surface, and a plurality of rolling elements disposed between the inner and outer rings. A first retainer has a first end engaged with the housing and a second end engaged with the first bearing outer ring. The first retainer is configured to position the first outer ring with respect to the central axis such that the ring is generally centered on the axis with the ring outer surface spaced radially inwardly from the housing inner surface so as to define a first annular clearance gap. Further, a second retainer has a first end engaged with the housing and a second end engaged with the second bearing outer ring. The second retainer is configured to position the second outer ring with respect to the central axis such that the ring is generally centered on the axis with the ring outer surface spaced radially inwardly from the housing inner surface so as to define a second annular clearance gap.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings:

FIG. 7 is an axial cross-sectional view of another rotary assembly incorporating two bearing assemblies of the present invention;

DETAILED DESCRIPTION OF THE INVENTION

Figure 1:
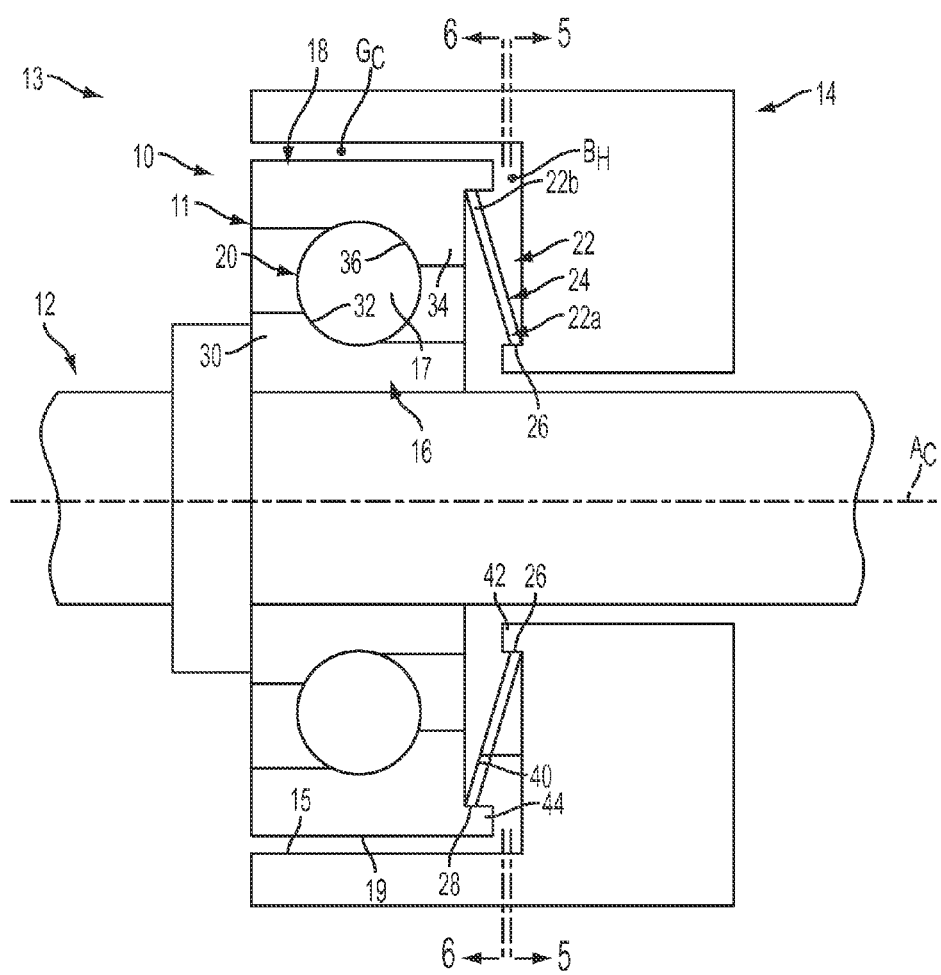
FIG. 1 is partly broken-away, axial cross-sectional view of a rotary assembly with a bearing assembly in accordance with the present invention.

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description.

Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-8 a first preferred embodiment of a bearing assembly 10 for rotatably coupling a shaft 12 and a housing 14; the shaft 12, the bearing assembly 10 and the housing 14 forming a rotary assembly 13. The shaft 12 has an outer surface 12 a and is rotatable about a central axis $A_C$ and the housing 14 has an inner circumferential surface 15 defining a bore $B_H$, the shaft 12 being at least partially disposed within the bore $B_H$. The bearing assembly 10 basically comprises a bearing 11 and a retainer 22. The bearing 11 includes an inner ring 16 disposed or disposable about or upon the shaft 12 and having an inner surface 17, an outer ring 18 disposed about the inner ring 16 and having an outer circumferential surface 19, and a plurality of rolling elements 20 disposed between the inner and outer rings 16, 18, respectively. The retainer 22 has a first axial end 22 a engaged or engageable with the housing 14 and a second axial end 22 b engaged with the bearing outer ring 18. Preferably, the retainer 22 includes a generally annular body 24 having an inner circular edge 26 at the first, inner radial end 22 a and an outer circular edge 28 at the second, outer radial end 22 b. The inner edge 26 defines a central opening $O_C$ and is engageable with the housing 14 and the outer edge 28 is engaged or engageable with the bearing outer ring 18, as described in further detail below.

Further, the retainer 22 is configured to position the outer ring 18 with respect to the central axis $A_C$ such that the ring 18 is generally centered on the axis $A_C$ with the ring outer surface 19 being spaced radially inwardly from the housing inner surface 15 so as to define an annular clearance gap $G_C$. The clearance gap $G_C$ provides sufficient space for thermal expansion of the housing 14 and/or bearing 11 without any adverse affect to bearing performance, as discussed in greater detail below. However, the housing 14 may be formed without any portion extending over the bearing outer ring 18, in which case there is no gap, as the bearing outer ring 18 is entirely supported by the retainer 22. Preferably, the retainer 22 is also configured to substantially prevent angular displacement of the outer ring 18 about the axis $A_C$, which may cause sliding or skidding of the rolling elements 20 against the inner and/or outer rings 16, 18. Furthermore, the retainer 22 is further configured to bias the outer ring 18 generally axially to provide and maintain a preload in the bearing 11.

Specifically, the bearing 11 is preferably an angular contact bearing, such that the inner ring 16 has a radially-outwardly extending annular shoulder 30 providing an inner raceway radial surface section 32 and the outer ring 18 has a radially-inwardly extending annular shoulder 34 providing an outer raceway radial surface section 36, the raceway surface sections 32, 36 being generally axially facing. As such, the retainer 22 biases the outer raceway radial surface section 36 generally toward the inner raceway radial surface section 32 so that contact is maintained between each raceway surface section 32, 36 and the plurality of rolling elements 20 generally along a line of contact $L_C$ (FIG. 2) extending at a skewed angle with respect to the shaft axis $A_C$. Although preferably an angular contact bearing as discussed above, the bearing 11 may be any other appropriate type of bearing, such as a standard ball bearing, a deep groove ball bearing, a cylindrical roller bearing, etc.

Preferably, the housing 14 has a radial surface 40 and an annular shoulder 42 extending generally axially from the radial retainer surface 40. The shoulder 42 has a diameter $D_{SH}$ (FIG. 5) and preferably extends in a complete circumference about the central axis $A_C$, but may alternatively be formed as two or more circumferentially-spaced arcuate segments or in any other appropriate manner. Further, the outer ring 18 preferably has opposing axial ends 18 a, 18 b and an annular shoulder 44 extending generally axially from one of the axial ends 18 a or 18 b and generally toward the housing radial surface 40. As with the housing shoulder 42, the bearing ring shoulder 44 preferably extends in a complete circumference about the central axis $A_C$, but may also be formed as arcuate segments or otherwise. Further, the outer ring shoulder 44 has a diameter $D_{SH}$ that is substantially greater than the housing shoulder diameter $D_{SH}$. With the preferred shoulders 42, 44, the retainer 22 is preferably positioned such that the retainer inner circular edge 26 is disposed about the housing shoulder 42 and the retainer outer circular edge 28 is disposed within the outer ring shoulder 44. As such, the retainer 22 couples the bearing outer ring 18 with the housing 14 such that the outer ring 18 is suspended from the housing shoulder 42, thereby substantially fixing the position of the outer ring 18 radially, rotationally and axially with respect to the shaft axis $A_C$.

Figure 2:
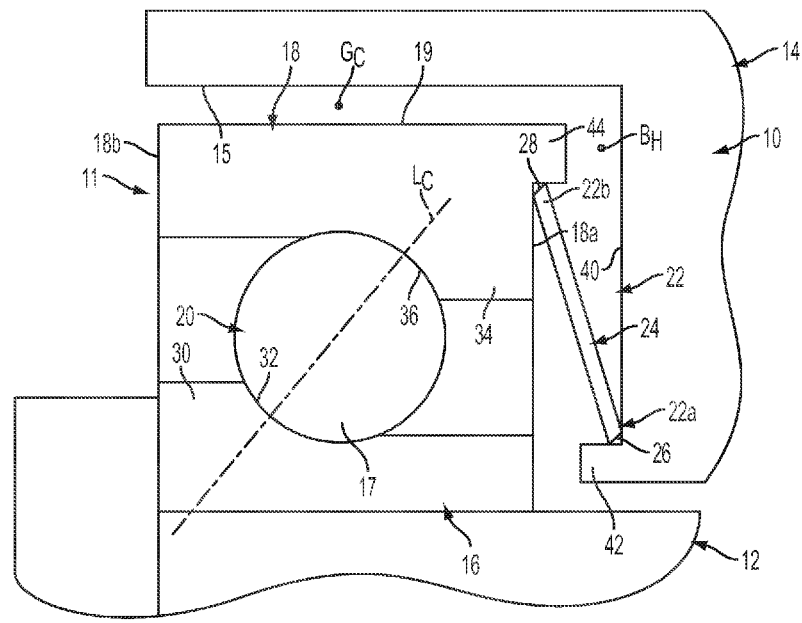
FIG. 2 is an enlarged, broken-away view of a portion of the bearing assembly of FIG. 1.
Figure 3:
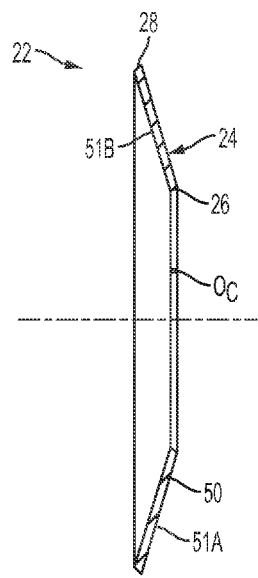
FIG. 3 is an axial cross-sectional view of a retainer of the bearing assembly.
Figure 4:
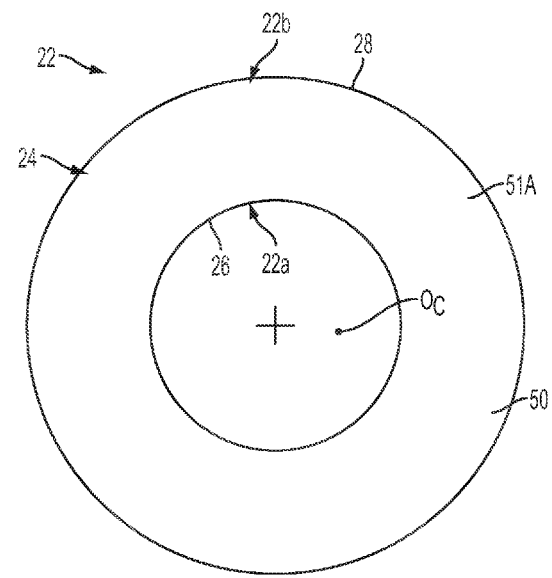
FIG. 4 is a front plan view of the retainer.
Figure 6:
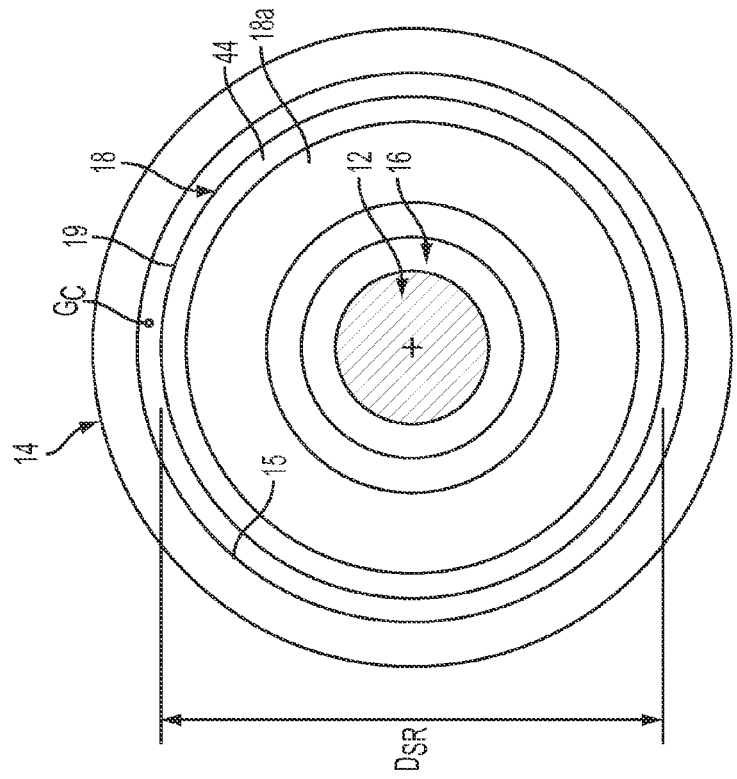
FIG. 6 is a radial cross-sectional view through line 6-6 of FIG. 1.
Figure 5:
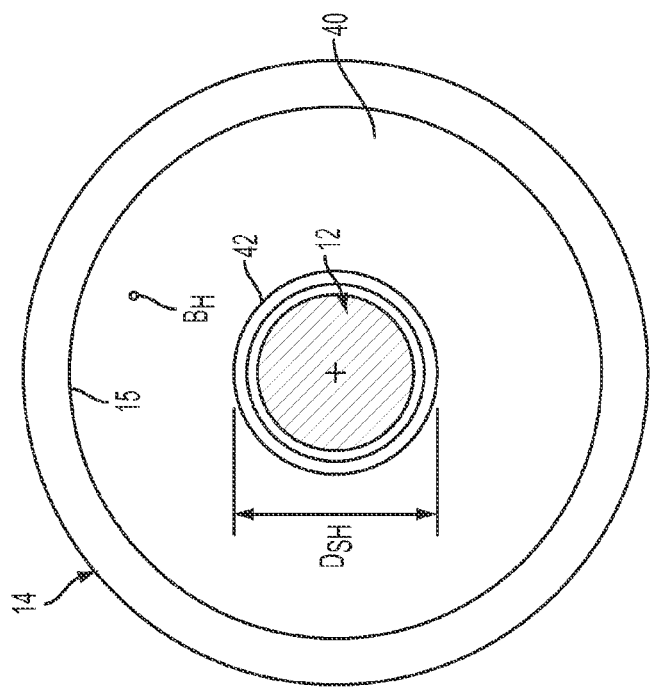
FIG. 5 is a radial cross-sectional view of through line 5-5 of FIG. 1.

Referring particularly to FIGS. 2-3, the retainer annular body 24 is preferably formed as a generally conical disk 50 having a convex outer surface 51A facing generally toward the housing radial surface 40 and a concave inner surface 51B facing generally toward the bearing 11. Preferably, the disk 50 is bendable or deflectable in generally radial directions so as to provide a spring force tending to bias the outer ring 18 generally axially away from the housing radial surface 40, and thus biasing the outer ring radial shoulder 34 toward the inner ring radial shoulder 30 and establishing the preload in the bearing 11.

Figure 8:
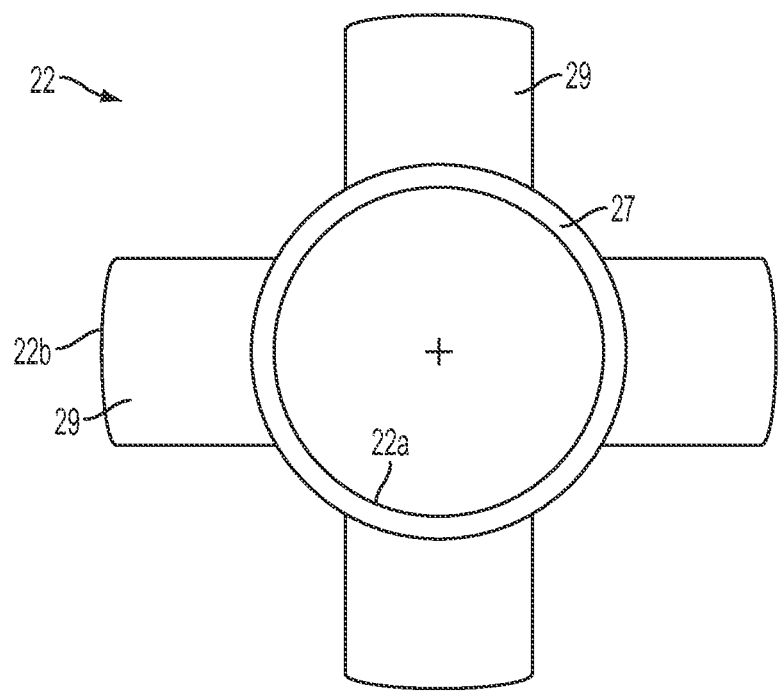
FIG. 8 is a plan view of an alternative construction of the retainer.

Most preferably, the retainer annular body is provided by a conventional Belleville spring of a commercially available size. However, it is within the scope of the present invention to form the retainer 22 in any other appropriate manner capable of functioning as generally described herein. For example, the retainer 22 may be formed having a central hub 27 and two or more circumferentially spaced tabs 29 extending radially outwardly from the hub 27, as depicted in FIG. 8, the hub 27 being engaged with the housing 14 and the tabs 29 engaged with the bearing outer ring 18. Further, the retainer 22 may be alternatively formed and positioned such that the retainer first end 22 a, engaged with the housing 14, is an outer radial end and the retainer second end 22 a, engaged with the bearing outer ring 18, is an inner radial end (structure not shown), in which case the housing shoulder diameter $D_{SH}$ would be substantially greater than the ring shoulder diameter $D_{SR}$.

By having the above-described retainer 22, the bearing assembly 10 enables the rotary assembly 13 to operate over a wide temperature range while avoiding certain adverse effects. Specifically, at higher operating temperatures, the bearing 11 and/or the housing 14 will experience thermal expansion, which in previously known bearing assemblies would cause interference between an outer ring and a housing bore that prevented axial displacement of the ring necessary to establish bearing preload and/or generated a radial inward force on the outer ring hindering rolling motion of the rolling elements. Thus, by coupling the bearing outer ring 18 to the housing 14 by means of the retainer 22, the outer ring 18 is radially fixed so as to be non-rotatable about the central axis $A_C$ while providing a substantial annular clearance gap $G_C$. Such a clearance gap $G_C$ provides space necessary to compensate for thermal growth of the housing 14 and/or bearing 11.

Referring now specifically to FIG. 7, in a presently preferred application, the bearing assembly 10 is incorporated into a rotary assembly 13 formed as a rotary actuator 60, most preferably an X-ray tube actuator, which includes two bearings 11 and two retainers 22. Each bearing 11 and each retainer 22 is substantially similarly formed, and formed at least generally as described above, but are oriented in opposing directions, as follows. Specifically, the rotary actuator 60 includes first and second bearings 62, 63 spaced apart axially along the shaft 12, a first retainer 64 engaged with the first bearing 62, and a second retainer 65 engaged with the second bearing 63.

The housing 14 preferably includes a generally circular cylindrical body 65 with a central annular portion 66 extending radially inwardly from the housing inner circumferential surface 15 and disposed generally between the first and second bearings 62, 63. As such, the housing inner surface 15 is divided into first and second inner surface sections 67A, 67B surrounding each bearing 62, 63, respectively. Further, the housing central portion 66 has opposing radial surfaces 68A, 68B and first and second annular shoulders 70A, 70B each extending generally axially from a separate one of the two radial surfaces 68A, 68B, respectively.

Furthermore, each of the first and second bearings 62, 63 includes an inner ring 72, 74 disposed upon the shaft 12, an outer ring 76, 78 disposed about the inner ring 72, 74, respectively, and having an outer circumferential surface 77, 78, and a plurality of rolling elements 80, 82 disposed between the inner and outer rings 72/76 and 74/78, respectively. The outer ring 76, 78 of each one of the first and second bearings 62, 63 has opposing inner and outer axial ends 76a, 76b and 78a, 78b. An annular shoulder 84, 86 extends generally axially from the inner axial ends 76a, 78a of each outer ring 76, 78 and generally toward the housing central portion 66. Preferably, each of the first and second bearings 62, 63 is an angular contact bearing. As such, each inner ring 72, 74 preferably has a radially-outwardly extending annular shoulder 88, 90 providing an inner raceway radial surface section 89, 91 and each outer ring 76, 78 has a radially-inwardly extending annular shoulder 92, 94 providing an outer raceway radial surface section 93, 95, respectively. Furthermore, the bearings 62, 63 are preferably arranged such that each inner ring radial surface section 89, 91 faces generally toward the center $C_H$ of the housing 14, and thus generally toward each other, and each outer ring radial surface section 93, 95 faces generally toward the axial ends 14a, 14b of the housing 14 and generally away from each other.

Still referring to FIG. 7, the first retainer 64 has a first, inner end 64a engaged with the housing first shoulder 70A and a second, outer end 64b engaged with the shoulder 84 of the first bearing outer ring 76. The first retainer 64 is configured to position the first outer ring 76 with respect to the central axis $A_C$ such that the ring 76 is generally centered on the axis $A_C$, with the ring outer surface 77 being spaced radially inwardly from the surrounding inner surface section 67A of the housing 14 so as to define a first annular clearance gap $G_{C1}$. Similarly, the second retainer 65 has a first, inner end 65a engaged with the housing second shoulder 70B and a second, outer end 65b engaged with the shoulder 86 of the second bearing outer ring 78. As with the first retainer 64, the second retainer 65 is configured to position the second outer ring 78 with respect to the central axis $A_C$ such that the ring 78 is generally centered on the axis $A_C$, with the ring outer surface 79 being spaced radially inwardly from the surrounding inner surface section 67B of the housing 14 so as to define a second annular clearance gaps $G_{C2}$.

As described above, each one of the first and second retainers 64, 65 includes a generally annular body 96, 97 having an inner circular edge 96a, 97a at the first end 64a, 65a, the inner edge 96a, 97a defining a central opening, and an outer circular edge 96b, 97b at the second end 64b, 65b. Each retainer inner edge 96a, 97a is disposed about the associated housing shoulder 70A, 70B, respectively, and each retainer outer edge 96b, 97b is disposed within the shoulder 84, 86 of the associated outer ring 76, 78, respectively. Further, the first retainer 64 biases the first bearing outer ring 76 in a first axial direction $D_{A1}$, such that the first bearing outer raceway radial surface section 93 is biased generally axially toward the first bearing inner raceway radial surface section 89, thereby establishing a preload in the first bearing 62 Likewise, the second retainer 65 biases the second bearing outer ring 78 in a second, opposing axial direction $D_{A2}$ such that the second bearing outer raceway radial surface section 95 is biased generally axially toward the second bearing inner raceway radial surface section 91.

Figure 9:
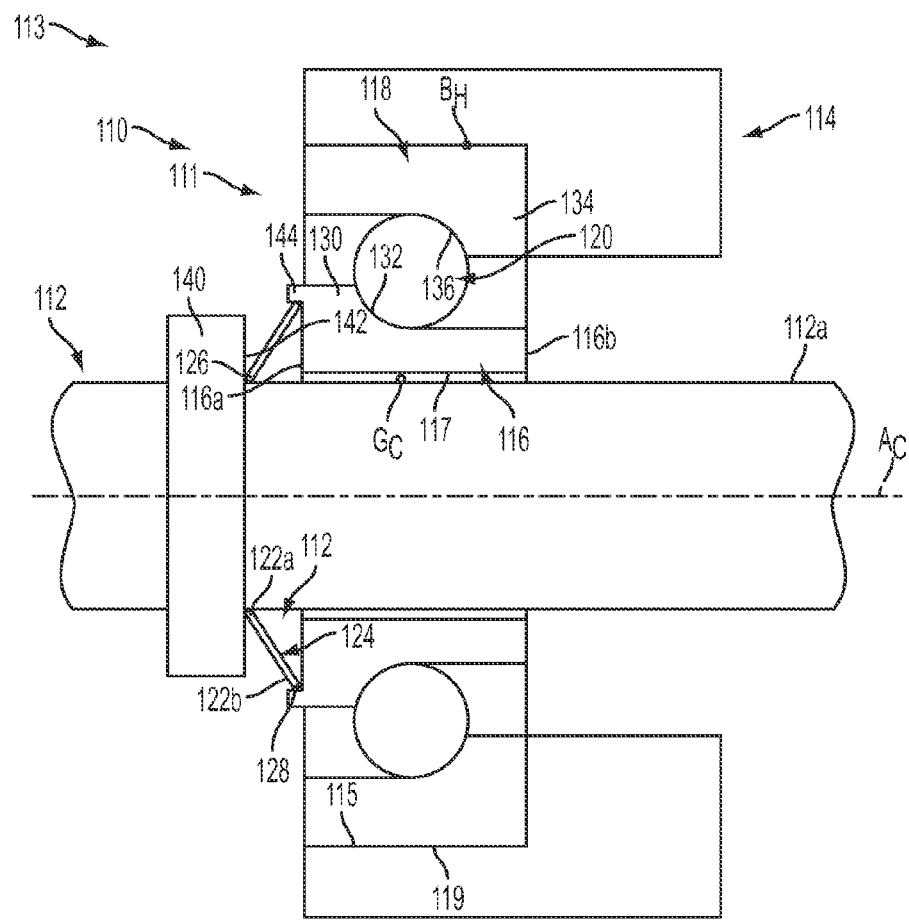
FIG. 9 is partly broken-away, axial cross-sectional view of a rotary assembly with a second embodiment bearing assembly in accordance with the present invention.
Figure 11:
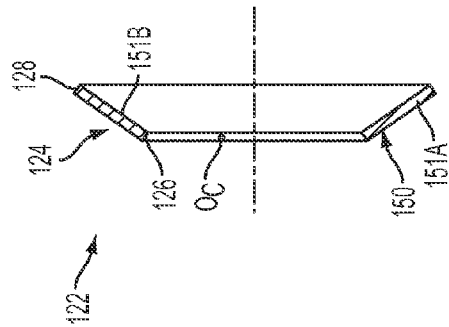
FIG. 11 is an axial cross-sectional view of a retainer of the second embodiment bearing assembly.
Figure 10:
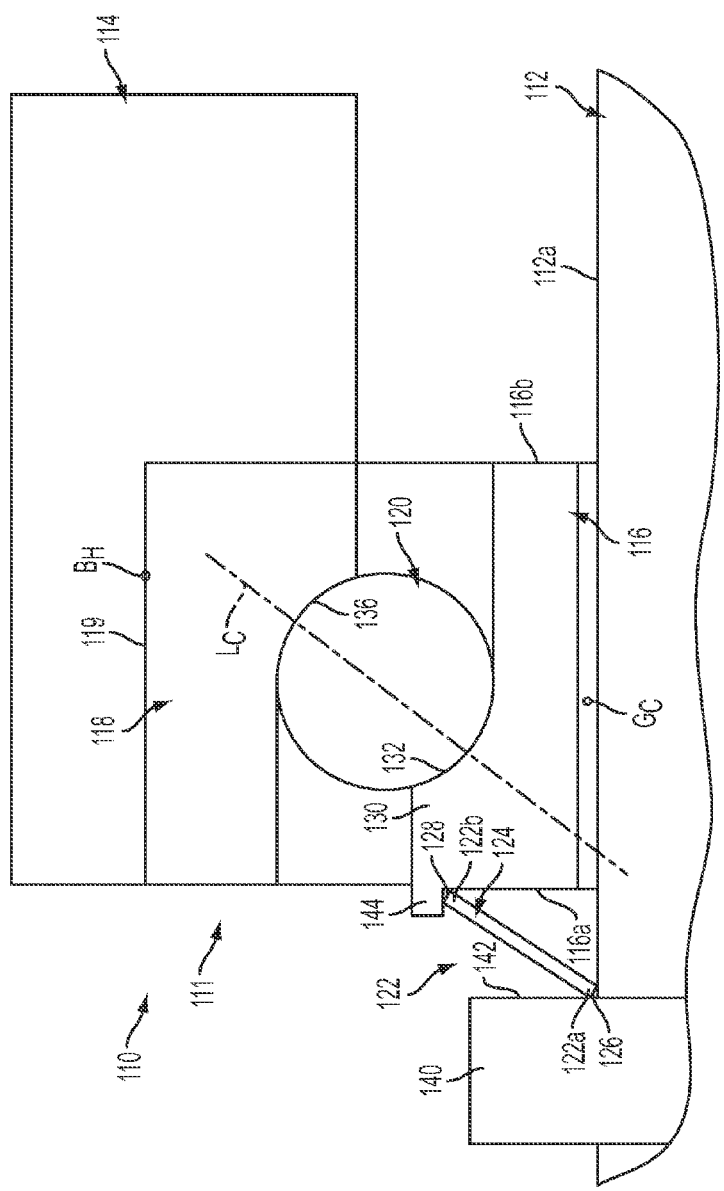
FIG. 10 is an enlarged, broken-away view of a portion of the bearing assembly of FIG. 9.

Referring now to FIGS. 9-11, there is shown a second, alternative embodiment of a bearing assembly 110 for rotatably coupling a shaft 112 and a housing 114; the shaft 112, the bearing assembly 110 and the housing 114 forming a rotary assembly 113. 'The shaft 112 has an outer surface 112a and is rotatable about a central axis $A_C$ and the housing 114 has an inner circumferential surface 115 defining a bore $B_H$, the shaft 112 being at least partially disposed within the bore $B_H$. The bearing assembly 110 basically comprises a bearing 111 and a retainer 122. The bearing 111 includes an inner ring 116 disposable about the shaft 112 and having an inner surface 117, an outer ring 118 disposed about the inner ring 116 and having an outer circumferential surface 119 engaged with the housing bore $B_H$, and a plurality of rolling elements 120 disposed between the inner and outer rings 116, 118, respectively. The retainer 122 has a first axial end 122a engaged or engageable with the shaft 112, either directly with a portion of the shaft 112 as depicted or indirectly through a body (not shown) mounted on the shaft 112, and a second axial end 122b engaged with the bearing inner ring 116. Preferably, the retainer 122 includes a generally annular body 124 having an inner circular edge 126 at the first, inner radial end 122b and an outer circular edge 128 at the second, outer radial end 122b. The inner edge 126 defines a central opening $O_C$ and is engageable with the shaft 112 and the outer edge 128 is engaged or engageable with the bearing inner ring 116, as described in further detail below.

Further, the retainer 122 is configured to position the inner ring 116 with respect to the central axis $A_C$ such that the ring 116 is generally centered on the axis $A_C$ with the ring inner surface 117 being spaced radially outwardly from the shaft outer surface 112a so as to define an annular clearance gap $G_C$. The clearance gap $G_C$ provides sufficient space for thermal expansion of the shaft 112 and/or bearing 111 without any adverse affect to bearing performance Preferably, the retainer 122 is also configured to substantially prevent angular displacement of the inner ring 116 about the axis $A_C$, which may cause sliding or skidding of the rolling elements 120 against the inner and/or outer rings 116, 118. Furthermore, the retainer 122 is further configured to bias the inner ring 116 generally axially to provide and maintain a preload in the bearing 111.

Specifically, the bearing 111 is preferably an angular contact bearing, such that the inner ring 116 has a radially-outwardly extending annular shoulder 130 providing an inner raceway radial surface section 132 and the outer ring 118 has a radially-inwardly extending annular shoulder 134 providing an outer raceway radial surface section 136, the raceway surface sections 132, 136 being generally axially facing. As such, the retainer 122 biases the inner raceway radial surface section 132 generally toward the outer raceway radial surface section 136 so that contact is maintained between each raceway surface section 132, 136 and the plurality of rolling elements 120 generally along a line of contact $L_C$ (FIG. 10)

extending at a skewed angle with respect to the shaft axis $A_C$. Although preferably an angular contact bearing as discussed above, the bearing 111 may be any other appropriate type of bearing, such as a standard ball bearing, a deep groove ball bearing, a cylindrical roller bearing, etc.

Preferably, the shaft 112 has an annular shoulder 140 or a separate ring or other body (none shown) providing a radial stop surface 142, the shoulder 140 preferably extending in a complete circumference about the central axis $A_C$, but may alternatively be formed as two or more circumferentially-spaced arcuate segments or in any other appropriate manner. Further, the inner ring 116 preferably has opposing axial ends 116a, 116b and an annular shoulder 144 extending generally axially from one of the axial ends 116a or 116b and generally axially toward the housing radial surface 140. As with the shaft shoulder 140, the bearing ring shoulder 144 preferably extends in a complete circumference about the central axis $A_C$, but may also be formed as arcuate segments or otherwise. With the preferred shoulders 140, 144, the retainer 122 is preferably positioned such that the retainer inner circular edge 126 is disposed about the shaft outer surface 112a and retained axially by the shoulder 140 and the retainer outer circular edge 128 is disposed within the inner ring shoulder 144. As such, the retainer 122 couples the bearing inner ring 116 with the shaft 112 such that the inner ring 116 is suspended from the shaft 112, thereby substantially fixing the position of the inner ring 116 radially, rotationally and axially with respect to the shaft axis $A_C$.

Referring now to FIGS. 10 and 11, the retainer annular body 124 is preferably formed as a generally conical disk 150 having a convex outer surface 151A facing generally toward the shaft radial surface 140 and a concave inner surface 151B facing generally toward the bearing 111. Preferably, the disk 150 is bendable or deflectable in generally radial directions so as to provide a spring force tending to bias the inner ring 116 generally axially away from the shaft radial surface 140, and thus biasing the inner ring radial shoulder 130 toward the outer ring radial shoulder 134 and establishing the preload in the bearing 111. Most preferably, the retainer annular body 124 is provided by a conventional Belleville spring of a commercially available size. However, it is within the scope of the present invention to form the retainer 122 in any other appropriate manner capable of functioning as generally described herein, for example, with a central hub and two or more circumferentially spaced tabs extending radially outwardly from the hub in a similar manner as shown in FIG. 8. Further, the retainer 122 may be alternatively formed and positioned such that the retainer first end 122a, engaged with the shaft 112, is an outer radial end and the retainer second end 122a, engaged with the bearing inner ring 116, is an inner radial end (structure not shown), in which case the shaft shoulder diameter (not indicated) would be substantially greater than the ring shoulder diameter (not indicated).

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

I claim:

1. A bearing assembly for rotatably coupling a shaft and a housing, the shaft being rotatable about a central axis and the housing having an inner circumferential surface defining a bore, the bearing assembly comprising:

an inner ring disposable upon the shaft and having an inner circumferential surface extending between axial ends of the inner ring;

an outer ring disposed about the inner ring and having an outer circumferential surface extending between axial ends of the outer ring;

a ring annular shoulder extending generally axially from one of the axial ends of one of the inner ring or the outer ring and generally toward a radial surface of the housing, the ring annular shoulder having an inner circumferential surface;

a plurality of rolling elements disposed between the inner and outer rings; and a retainer having a first, radially inner axial end and a second, radially outer axial end, the retainer being configured to position the one of the inner ring and the outer ring with respect to the central axis such that the one of the inner ring and the outer ring is generally centered on the central axis, wherein the first, radially inner axial end of the retainer engages with one of:

(a) an outer circumferential surface of a housing annular shoulder, wherein the housing annular shoulder extends generally axially from the radial surface of the housing towards the one of the inner ring and the outer ring, or (b) an outer circumferential surface of the shaft, and the second, radially outer axial end of the retainer engages with the inner circumferential surface of the ring annular shoulder, wherein the retainer is configured to fix the position of the engaged one of the inner ring and the outer ring radially, rotationally and axially with respect to the central axis and wherein the retainer is configured to maintain an annular clearance gap radially between the inner ring and the shaft, or radially between the outer ring and the housing, by suspending the engaged outer ring about the housing annular shoulder or the engaged inner ring about the shaft.

2. The bearing assembly as recited in claim 1 wherein one of:

the first, radially inner axial end of the retainer is positioned engaging with the outer circumferential surface of the shaft, the second, radially outer axial end of the retainer is positioned engaging with the inner circumferential surface of the ring annular shoulder, and the ring annular shoulder is positioned on the inner ring, wherein the retainer positions the inner ring respective to the housing such that the inner ring inner surface is spaced radially outwardly from the shaft outer surface so as to retain the annular clearance gap; or the first, radially inner axial end of the retainer is positioned engaging with the housing annular shoulder, the second, radially outer axial end of the retainer is positioned engaging the inner circumferential surface of the ring annular shoulder, and wherein the retainer positions the outer ring respective to the housing such that the outer ring outer surface is spaced radially inwardly from the housing inner surface so as to retain the annular clearance gap.

3. The bearing assembly as recited in claim 1 wherein the retainer is further configured to bias the one of the inner ring and the outer ring generally axially.

4. The bearing assembly as recited in claim 3 wherein the inner ring has a radially-outwardly extending annular shoulder providing an inner raceway radial surface section and the outer ring has a radially-inwardly extending annular shoulder providing an outer raceway radial surface section, the retainer biasing one of the inner raceway radial surface section generally toward the outer raceway radial surface section and the outer raceway radial surface section generally toward the inner raceway radial surface section.

5. The bearing assembly as recited in claim 1 wherein one of:
the retainer includes a generally annular body having an inner circular edge at the first, radially inner axial end, the inner edge defining a central opening and being engageable with the one of the shaft and the housing, and an outer circular edge at the second, radially outer axial end, the outer edge being engaged with the radial inside of the ring annular shoulder; and
the retainer includes a generally annular body having an inner circular edge at the first, radially inner axial end, the inner edge defining a central opening and being engageable with the radial inside of the ring annular shoulder, and an outer circular edge at the second, radially outer axial end, the outer edge being engaged with the one of the shaft and the housing.

6. The bearing assembly as recited in claim 5 wherein the retainer outer circular edge is disposed at least partially radially within the ring annular shoulder.

7. The bearing assembly as recited in claim 5 wherein the retainer annular body is formed as a generally conical disk.

8. The bearing assembly as recited in claim 1 wherein the retainer is configured to apply a resilient, radially-outward force on the inner circumferential surface of the ring annular shoulder.

9. A rotary assembly comprising:
a housing having an inner circumferential surface defining a bore;
a shaft disposed within the housing bore and rotatable about a central axis;
a bearing including an inner ring having an inner circumferential surface extending between axial ends of the inner ring, the inner circumferential surface disposed about the shaft, an outer ring disposed about the inner ring and having an outer circumferential surface extending between axial ends of the outer ring, a plurality of rolling elements disposed between the inner and outer rings;
a ring annular shoulder extending generally axially from one of the axial ends of one of the inner ring or the outer ring and generally toward a radial surface of the housing, the ring annular shoulder having an inner circumferential surface; and
a retainer having a first, radially inner axial end and a second, radially outer axial end, the retainer being configured to position the one of the inner ring and the outer ring with respect to the central axis such that the one of the inner ring and the outer ring is generally centered on the central axis, wherein the first, radially inner axial end of the retainer engages with one of:
(a) an outer circumferential surface of a housing annular shoulder, or
(b) an outer circumferential surface of the shaft,
wherein the second, radially outer axial end of the retainer engages with the inner circumferential surface of the ring annular shoulder, so as to apply at least a radially-outward force on the ring annular shoulder, and
wherein the retainer constrains the position of the engaged one of the inner ring and the outer ring radially, rotationally and axially with respect to the central axis and maintains an annular clearance gap radially between the inner ring and the shaft or radially between the outer ring and the housing by suspending the engaged outer ring about the housing annular shoulder or the engaged inner ring about the shaft.

10. The rotary assembly as recited in claim 9 wherein one of:
the first, radially inner axial end of the retainer is positioned engaging with the outer circumferential surface of the shaft, and the second, radially outer axial end of the retainer is positioned engaging with the inner circumferential surface of the ring annular shoulder, wherein the retainer positions the inner ring respective to the housing such that the inner ring inner surface is spaced radially outwardly from the shaft outer surface so as to retain the annular clearance gap; or
the first, radially inner axial end of the retainer is positioned engaging with the annular shoulder of the housing, and the second, radially outer axial end of the retainer is positioned engaging with the inner circumferential surface of the ring annular shoulder, wherein the retainer positions the outer ring respective to the housing such that the outer ring outer surface is spaced radially inwardly from the housing inner surface so as to retain the annular clearance gap.

11. The rotary assembly as recited in claim 10 wherein the bearing inner ring has a raceway annular shoulder extending radially-outwardly and providing an inner raceway radial surface section and the bearing outer ring has a raceway annular shoulder extending radially-inwardly, and providing an outer raceway radial surface section, the retainer biasing one of the inner raceway radial surface section generally axially toward the outer raceway radial surface section and the outer raceway radial surface section generally axially toward the inner raceway radial surface section.

12. The rotary assembly as recited in claim 9 wherein the retainer includes a generally annular body having an inner circular edge at the first end, the inner edge defining a central opening and being engaged with the one of the shaft and the housing, and an outer circular edge at the second end, the outer edge being engaged with the ring annular shoulder.

13. The rotary assembly as recited in claim 12 wherein the ring annular shoulder is located on the outer ring, the retainer inner circular edge being disposed about the housing annular shoulder and the retainer outer circular edge being disposed within the ring annular shoulder.

14. The rotary assembly as recited in claim 12 wherein the retainer annular body is formed as a generally conical disk.

15. The rotary assembly as recited in claim 9 wherein the bearing is a first bearing, the retainer is a first retainer and the rotary assembly further comprises:
a second bearing spaced axially from the first bearing and including an inner ring disposed upon the shaft, an outer ring disposed about the inner ring and having an outer circumferential surface, a plurality of rolling elements disposed between the inner and outer rings; and
a second retainer having a first axial end engaged with one of the shaft and the housing and a second axial end engaged with one of the second bearing inner ring and the second bearing outer ring, the retainer being configured to position the one of the second bearing inner ring and the second bearing outer ring with respect to the central axis such that the one of the inner ring and the outer ring is generally centered on the central axis.

16. The rotary assembly as recited in claim 15 wherein:
the housing has a central portion extending radially inwardly from the housing inner circumferential surface and disposed between the first and second bearings, the central portion having opposing radial surfaces, wherein the housing annular shoulder provides a first annular shoulder, and the housing further comprises a second annular shoulder, the first and second annular shoulders extending axially from a separate one of the two opposing radial surfaces;

the outer ring of the second bearing has opposing axial ends and a second ring annular shoulder extending generally axially from one of the axial ends thereof and generally toward the housing central portion; and each one of the first and second retainers includes a generally annular body having an inner circular edge at the first end, the inner edge defining a central opening, and an outer circular edge at the second end, the first retainer inner edge being disposed about the housing first shoulder and the first retainer outer edge being disposed within the ring shoulder of the first bearing, the second retainer inner edge being disposed about the housing second shoulder and the second retainer outer edge being disposed within the ring shoulder of the second bearing.

17. The rotary assembly as recited in claim 16 wherein:

the inner ring of each one of the first and second bearings has a radially-outwardly extending annular raceway shoulder providing an inner raceway radial surface section and the outer ring of each one of the first and second bearings has a radially-inwardly extending annular raceway shoulder providing an outer raceway radial surface section;

the first retainer biases the first bearing outer ring in a first axial direction such that the outer raceway radial surface section of the first bearing outer ring is biased generally axially toward the inner raceway radial surface section of the first bearing inner ring; and the second retainer biases the second bearing outer ring in a second, opposing axial direction such that the outer raceway radial surface section of the second bearing outer ring is biased generally toward the inner raceway radial surface section of the second bearing inner ring.

18. A rotary assembly comprising:

a housing having an inner circumferential surface defining a bore;

a shaft disposed within the housing bore and rotatable about a central axis of the shaft;

a first bearing and a second bearing, the first and second bearings being spaced apart axially along the shaft, each one of the first and second bearings including an inner ring disposed about the shaft, an outer ring disposed about the inner ring and having an outer circumferential surface extending between axial ends of the outer ring, a plurality of rolling elements disposed between the inner and outer rings;

a ring annular shoulder formed on each outer ring of each of the first and second bearings, the respective ring annular shoulders extending generally axially from an axial end of the outer ring of a respective one of the first and second bearings, and generally toward a respective radial surface of the housing, each one of the respective ring annular shoulders having an inner circumferential surface;

a first annular shoulder of the housing, wherein the first annular shoulder of the housing extends generally axially from a first axial end surface of the housing towards an opposing axial surface of an adjacent one of the outer ring and the inner ring of the first bearing;

a second annular shoulder of the housing, wherein the second annular shoulder of the housing extends generally axially from a second, opposite axial end surface of the housing towards an opposing axial surface of an adjacent one of an outer ring and an inner ring of the second bearing;

a first retainer having a first, radially inner axial end engaged with an outer circumferential surface of the first annular shoulder of the housing and a second, radial outer axial end engaged with an inner circumferential surface of the ring annular shoulder of the first bearing outer ring, the first retainer being configured to position the first outer ring with respect to the central axis such that the first bearing is generally centered on the central axis with the outer ring outer surface spaced radially inwardly from the housing inner surface so as to retain a first annular clearance gap radially between the housing and the outer ring of the first bearing by suspending the outer ring of the first bearing about the first annular shoulder of the housing or the inner ring of the first bearing about the shaft; and a second retainer having a first, radially inner axial end engaged with an outer circumferential surface of the second annular shoulder of the housing and a second, radial outer axial end engaged with an inner circumferential surface of the ring annular shoulder of the second bearing outer ring, the second retainer being configured to position the second outer ring with respect to the central axis such that the second bearing is generally centered on the central axis with the outer ring outer surface spaced radially inwardly from the housing inner surface so as to retain a second annular clearance gap radially between the housing and the outer ring of the second bearing by suspending the outer ring of the second bearing about the second annular shoulder of the housing or the inner ring of the second bearing about the shaft, wherein the first retainer is configured to fix the position of the first bearing outer ring radially, rotationally and axially with respect to the central axis, and wherein the second retainer is configured to fix the position of the second bearing outer ring radially, rotationally and axially with respect to the central axis.

19. The rotary assembly as recited in claim 18 wherein:

the housing has a central portion extending radially inwardly from the housing inner circumferential surface and disposed generally between the first and second bearings, the central portion having opposing radial surfaces, wherein the first and second annular shoulders each extend generally axially from a separate one of the two radial surfaces;

the ring annular shoulder of each of the outer rings extends generally axially toward the housing central portion; and each one of the first and second retainers includes a generally annular body having an inner circular edge at the first end, the inner edge defining a central opening, and an outer circular edge at the second end, the first retainer inner edge being disposed about the housing first shoulder and the first retainer outer edge being disposed within the first bearing ring shoulder, the second retainer inner edge being disposed about the housing second shoulder and the second retainer outer edge being disposed within the second bearing ring shoulder.

20. The rotary assembly as recited in claim 19 wherein the annular body of each one of the first and second retainers is formed as a generally conical disk.

* * * * *